United States Patent

[11] 3,593,169

[72] Inventor Elliott W. Markow
Burlington, Mass.
[21] Appl. No. 858,413
[22] Filed Sept. 16, 1969
[45] Patented July 13, 1971
[73] Assignee Newton Electronic Systems, Inc.
Waltham, Mass.

[54] TONE BURST GENERATOR
12 Claims, 4 Drawing Figs.

[52] U.S. Cl. .......... 328/223, 307/261, 307/262, 307/271, 328/27, 331/111
[51] Int. Cl. .......... H03k 1/12
[50] Field of Search .......... 307/262, 261, 271; 328/223, 261, 113, 27, 68; 331/111

[56] References Cited

UNITED STATES PATENTS

| | | | |
|---|---|---|---|
| 2,559,144 | 7/1951 | Baracket | 328/27 |
| 2,689,299 | 9/1954 | Anderson | 328/27 |
| 2,995,709 | 8/1961 | Bearwood et al. | 328/27 |
| 3,034,070 | 5/1962 | Wood | 328/223 X |
| 3,044,019 | 7/1962 | Dinter | 328/223 |
| 3,189,813 | 6/1965 | Friedrich | 307/261 X |
| 3,297,963 | 1/1967 | Halsted | 328/223 X |
| 3,363,198 | 1/1968 | Davies | 328/223 X |

*Primary Examiner*—Stanley T. Krawczewicz
*Attorney*—Rich and Ericson

ABSTRACT: A tone burst generator for applying balanced signals to a transmission line, comprising complementary pulse generators connected in series and a switching circuit connected between the output terminal of one and the input terminal of the other. The switching circuit is enabled by the presence of a signal applied to one of the pulse generators. A summing amplifier combines the outputs of the pulse generators for application to a transmission line.

INVENTOR.
ELLIOTT W. MARKOW
BY
Rich and Ericson
ATTORNEYS

INVENTOR.
ELLIOTT W. MARKOW
BY
Rich and Ericson
ATTORNEYS

TONE BURST GENERATOR

My invention relates to data transmission, and particularly to novel apparatus for applying balanced signals to a transmission line.

Transmission lines, such as telephone lines and the like, are not commonly provided with DC coupling. Accordingly, any DC component of a signal applied to such a line injects a pedestal on the line with a consequent loss of line capacity. Most effective use of such lines requires application of completely balanced signals to the line. However, many sources do not produce balanced signals. For example, a flying spot scanner, image orthicon, or the like, used to produce video signals for facsimile transmission, produces a train of unipolar pulses of varying duration corresponding to the distribution of copy on the record sheet being scanned. The object of my invention is to facilitate the transformation of such unbalanced signals into balanced signals that can be efficiently handled by a transmission line.

Briefly, the above and other objects of my invention are attained by a novel signal generator that responds to pulses of varying duration to produce bursts of alternating current signals having an equal number of complete positive and negative half-cycles, each starting and ending at zero volts. The duration of each burst is 1 full cycle, if the applied pulse is less than 1 full cycle of the frequency of the signal generator in duration, and approximately equal in duration to the applied pulse for longer pulses, with a maximum deviation of about 1 cycle of the signal generator frequency. The apparatus comprises a pulse generator connected in series with an inverted pulse generator. Each pulse generator is triggerable to produce an output pulse. The pulses produced by the signal generators are of equal duration and amplitude, but are opposite in polarity. The trailing edge of the pulse produced by the first pulse generator is used to trigger the inverted pulse generator, and the outputs of both pulse generators are applied to a summing network. The first pulse generator is arranged to be triggered through an OR gate, in response either to an applied video signal or to a retriggering pulse. To provide for retriggering, an electric switch is connected between the output of the inverted pulse generator and the OR gate. When the switch is closed, the trailing edge of the pulse produced by the inverted pulse generator retriggers the first pulse generator, so that the two pulse generators function together as an oscillator. The switch is controlled by the other input terminal of the OR gate which receives the applied video signal, and causes the switch to be closed during the duration of any video pulse applied to that terminal. By that arrangement, the summing network output signal consists of an equal number of positive and negative half-cycles.

The manner in which the apparatus of my invention is constructed, and its mode of operation, will best be understood in the light of the following detailed description, together with the accompanying drawings, of various illustrative embodiments thereof.

IN THE DRAWINGS

Figure 1:
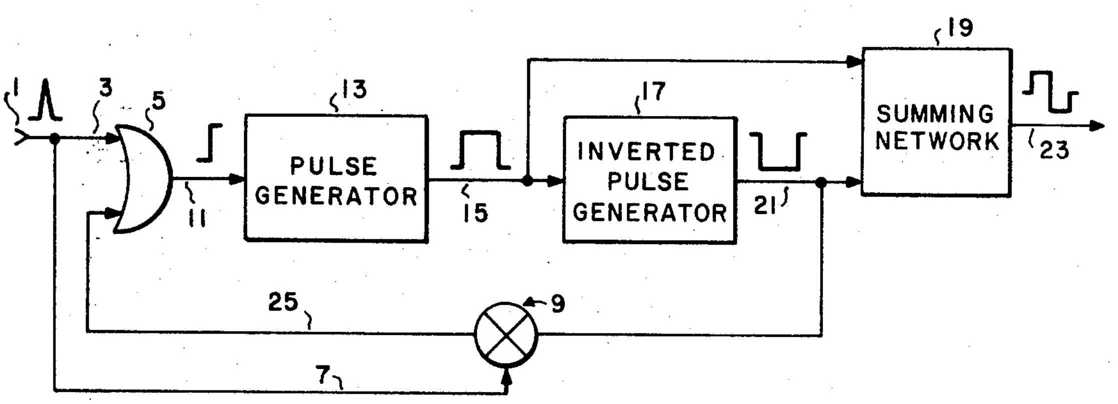
FIG. 1 is a schematic block wiring diagram of signal generator in accordance with my invention in its broader aspects.

Referring to FIG. 1, I have shown a signal generator comprising an input terminal 1 adapted to receive a signal which for the purposes of illustration will be described as the video signal from a flying spot scanner or vidicon tube. Such a signal generally comprises a train of pulses varying in nature from relatively sharp, short pulses representing fine lines in the copy being scanned, to longer pulses representing wider bands of data of the same light reflecting properties, such as black or white. These pulses are assumed for the purposes of illustration to be positive with respect to a reference ground potential.

The input terminal 1 is connected over a lead 3 to one input terminal of a conventional OR gate 5, and over a lead 7 to the control terminal of an electronic switch schematically indicated at 9.

The OR gate 5 has an output terminal 11 connected to the input terminal of a conventional pulse generator 13. The pulse generator 13 may be any conventional circuit for generating a pulse of predetermined duration in response to a positive going transition appearing on terminal 11.

The output terminal 15 of the pulse generator 13 is connected to an inverted pulse generator 17, and also to a summing network 19. The inverted pulse generator 17 may be any conventional circuit responsive to the trailing edge of the pulse produced on the lead 15 to produce an inverted pulse of equal duration on its output terminal 21.

The output terminal 21 of the inverted pulse generator 17 is connected to a second input terminal of the summing network 19. The output terminal 23 and of the summing network accordingly produces a balanced signal, comprising the pulse produced by the pulse generator 13 followed by the pulse produced by the inverted pulse generator 17, each time the pulse generator 13 produces an output signal.

The output terminal of the pulse generator 17 is connected through the switch 9 to a second input terminal of the OR gate 5. Thus, when the switch 9 is closed by the presence of a positive signal on the lead 7, the trailing edge of the pulse produced by the pulse generator 17 will retrigger the pulse generator 13 through the OR gate 5.

Figure 2:
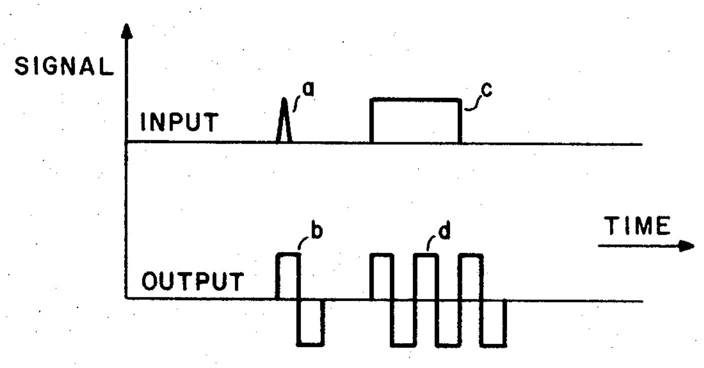
FIG. 2 is a graph of signal vs. time showing the relationship between typical input and output signals in the apparatus of FIG. 1.

FIG. 2 illustrates the mode of operation of the circuit of FIG. 1 in typical circumstances. In response to a brief pulse *a* applied to the lead 1, the pulse generator 13 will be triggered through the gate 5. A positive output pulse will be produced on the lead 13. At the trailing edge of this pulse, the pulse generator 17 will be triggered to produce a negative output pulse. The summing network 19 will accordingly produce a single cycle of alternating current on the lead 23. At the end of that pulse, there will be no input to the OR gate 5 and the switch 9 will be open. Accordingly, nothing further will occur until another pulse is applied to the lead 1.

When a longer pulse *c* is applied to the input terminal 1, as illustrated in FIG. 2, the sequence of events just described will occur, but at the end of the pulse produced by the pulse generator 17, the signal *c* will still be present on the lead 1, causing the switch 9 to be closed. The pulse generator 13 will then be retriggered by the trailing edge of the pulse on the lead 21, and the pulse generators 13 and 17 will continue to operate as an oscillator until the input pulse disappears.

It will be seen that the pulse generator 17 is always triggered when the pulse generator 13 produced a pulse, but that the pulse generator 13 is only retriggered as long as a signal persists on the lead 1. The number of positive and negative pulses produced by the summing network 19 is accordingly always equal.

Figure 3:
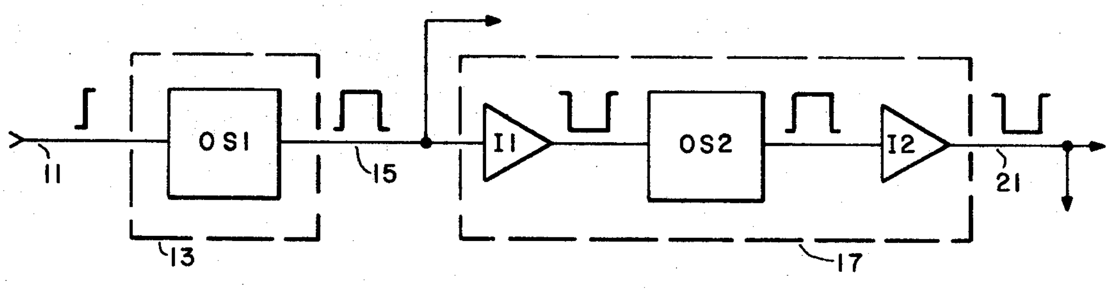
FIG. 3 is a schematic wiring diagram illustrating one specific embodiment of a portion of the circuit of FIG. 1.

FIG. 3 shows one embodiment of the pulse generators 13 and 17 in FIG. 1. As shown, the pulse generator 13 may comprise a conventional one-shot multivibrator OS1 that produces a positive output pulse in response to a positive going transition applied to its input terminal. The inverted pulse generator may comprise an identical one-shot multivibrator OS2 proceeded by an inverter I1 and followed by an inverter I2.

The purpose of the inverter I1 is to produce a positive going transition to trigger the multivibrator OS2 at the trailing edge of the pulse produced by the multivibrator 13.

The purpose of the inverter I2 is to produce a positive going retriggering transition at the trailing edge of the pulse produced by the multivibrator OS2, and at the same time produce the negative half-cycle required for application to the summing network 19.

Figure 4:
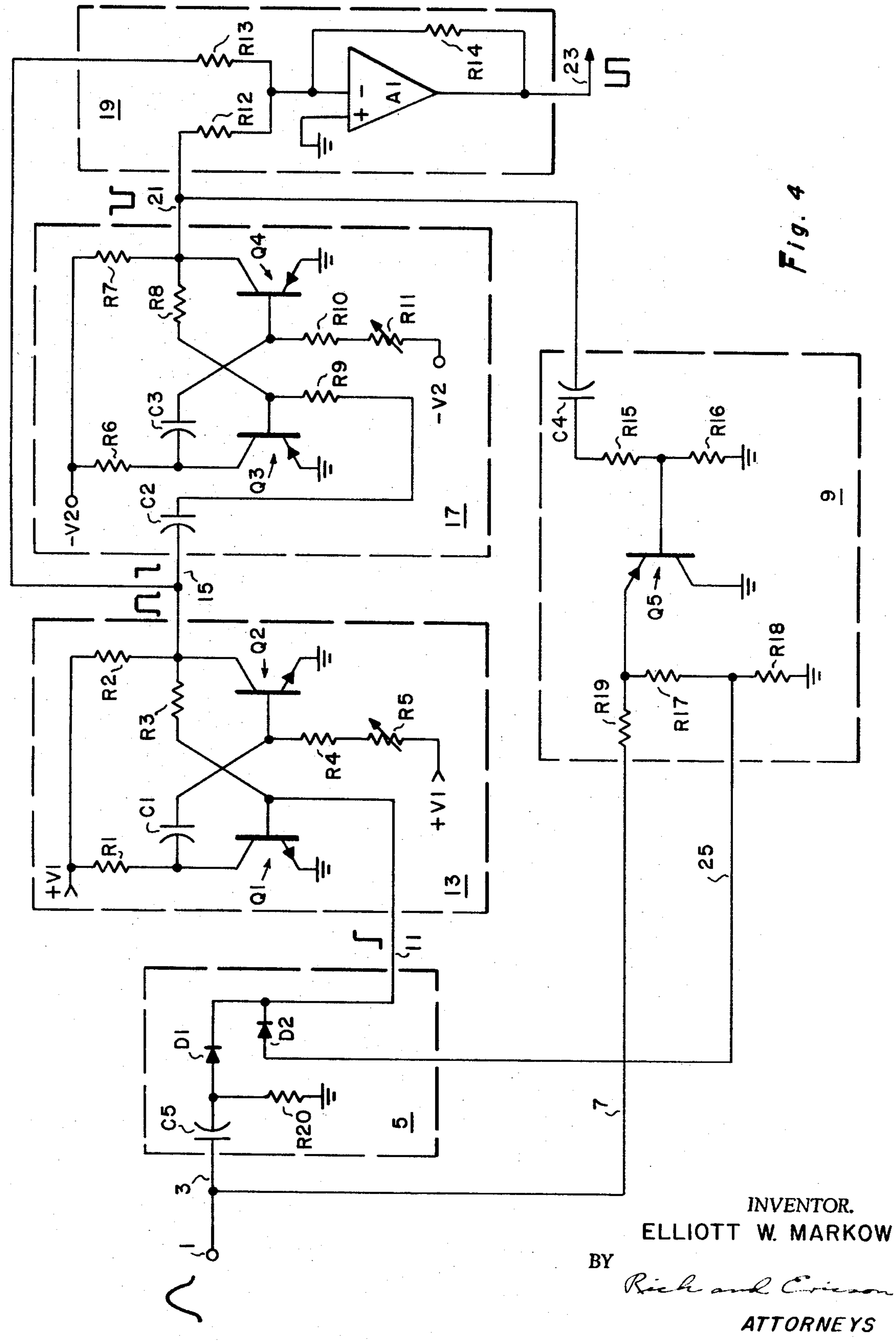
FIG. 4 is a schematic wiring diagram of a preferred embodiment of my invention.

FIG. 4 shows a preferred embodiment of the invention, in which the pulse generators comprise complementary monostable multivibrators Referring to FIG 4, the multivibrator 13 comprises two NPN transistors Q1 and Q2 each having its emitter grounded The collector of the transistor Q1 is returned to a suitable source of positive potential +V1 through a resistor R1. The collector of the transistor Q2 is returned to the same positive potential through a resistor R2.

The base of the transistor Q1 is connected to the collector of the transistor Q2 through a resistor R3. The base of the transistor Q2 is connected to the collector of the transistor Q1 through a capacitor C1. The base of the transistor Q2 is also returned to the source of potential +V1 through a fixed resistor R4 in series with a variable resistor R5. In response to a positive going transition applied to the input terminal 11 of the multivibrator 13, a positive pulse of fixed duration will be produced between the collector of the transistor Q2 and ground.

The multivibrator 17 comprises two PNP transistors Q3 and Q4. The emitter of each of these transistors is grounded as shown. The collector of the transistor Q3 is returned to a source of negative potential −V2 through a resistor R6. The collector of the transistor Q4 is returned to the same negative potential through a resistor R7. The base of the transistor Q3 is connected to the collector of the transistor Q4 through resistor R8. The base of the transistor Q4 is connected to the collector of the transistor Q3 through a capacitor C3.

The base of the transistor Q3 is connected to the output terminal 13 of the multivibrator 13 through a resistor R9 and a capacitor C2 in series. The base of the transistor Q4 is returned to the source of potential −V2 through a fixed resistor R10 in series with a variable resistor R11. With the construction shown, the negative going transition at the trailing edge of each pulse produced on the terminal 15 will cause a negative pulse of fixed duration to be produced on the terminal 21 at the collector of the transistor Q4.

In the preferred embodiment of FIG. 4, the summing network 19 comprises an operational amplifier A1 having two input summing resistors R12 and R13. A conventional feedback resistor R14 is connected across the amplifier A1.

The electronic switch 9 comprises a PNP transistor Q5 having a grounded collector. The output terminal 21 of the monostable multivibrator 17 is connected to the base of the transistor Q5 through a differentiator and potential dividing network comprising a capacitor C4, a resistor R15 and a resistor R16 in a path between the terminal 21 and ground. As shown, the junction of the resistors R15 and R16 is connected to the base of the transistor Q5. The emitter of the transistor Q5 is connected to the input terminal 1 through a resistor R19.

The emitter of the transistor Q5 is returned to ground through two resistors R17 and R18 in series. The junction of the resistors R17 and R18 is connected over lead 25 as one input terminal to the OR gate 5.

As shown, the OR gate 5 comprises two diodes D1 and D2. The input terminal 1 is connected to the diode D1 through a differentiator comprising a capacitor C5 in series with a resistor R20.

The operation of the apparatus of FIG. 4 will be generally apparent from the above description. Briefly, however, if a positive pulse is applied to terminal 1 with respect to ground, at its leading edge a positive voltage will appear across the resistor R20 and be applied through the diode D1 to the base of the transistor Q1, causing the monostable multivibrator 13 to produce an output pulse that is positive with respect to ground.

The positive pulse produced on the lead 15 is applied through the resistor R13 to the amplifier A1, and is inverted to produce the negative half-cycle of an output pulse. At the trailing edge of that pulse, the negative going transition drives the transistor Q3 into conduction, bringing the collector to a more positive potential and cutting off the transistor Q4 to produce a negative output pulse in the terminal 21. That pulse is applied through the resistor R12 and the amplifier A1 to produce the positive half-cycle of an output cycle of alternating current.

The transistor Q5 serves as a switch for feedback pulses. If a positive voltage appears on the lead 7, the transistor Q5 is in a conducting state and has an emitter voltage approaching zero volts with respect to ground. In that state, a positive voltage applied to the base with respect to ground will cause the transistor Q5 to cut off, bringing the emitter voltage to the level of terminal 7. A negative voltage applied to the base will not affect the emitter voltage of the transistor Q5.

At the leading edge of the pulse produced by the multivibrator 17, the negative-going pulse produced across the resistor R16 by the differentiating circuit comprising the capacitor C4 and the resistors R15 and R16 causes no change in the voltage at the emitter of the transistor Q5.

At the positive-going trailing edge of the pulse on the lead 21, the transistor Q5 will be cut off, and a positive-going transition will be applied through the diode D2 to register the multivibrator 13. That will produce a second pair of pulses at the output lead 23. On the other hand, if the input terminal 1 has returned to ground during the production of the first cycle comprising a pulse form the multivibrator 13 and a pulse for the multivibrator 17, then when the transistor Q5 is suddenly reverse biased at the trailing edge of the pulse on the lead 21, no retriggering transition will occur across the resistor R18 and no further action will occur until another positive-going pulse appears on the terminal 1.

Suitable values for the components of the circuit of FIG. 4 are shown in the following table:

| Component: | | Value |
|---|---|---|
| R1, R2, R6, R7 | ohms | 3.3K |
| R3, R8 | do | 47K |
| R4, R10 | do | 22K |
| R5, R11 | do | [1] 10K |
| R9, R17, R19 | do | 10K |
| R12, R13, R14, R16 | do | 20K |
| R15 | do | 12K |
| R18, R20 | do | 56K |
| C1, C3 | μf | .01 |
| C2 | pf | 220 |
| C4 | pf | 130 |
| C5 | pf | 82 |
| D1, D2 | | Type 1N251 |
| Q1, Q2 | | Type 2N3641 |
| Q3, Q4 | | Type 2N3638 |
| Q5 | | Type 2N3638 |

[1] Variable.

While I have described my invention with respect to the details of the various embodiments thereof, many changes and variations will occur to those skilled in the art upon reading my description. Such can obviously be made without departing from the scope of my invention.

Having thus described my invention, what I claim is:

1. A signal generator, comprising:

first pulse generating means responsive to an applied signal transition of predetermined polarity for producing a first unipolar output pulse, second pulse generating means connected to said first pulse generating means and responsive to the trailing edge of said output pulse for producing a second unipolar output pulse opposite in polarity to said first output pulse, a switch connected between said second pulse generating means and said first pulse generating means and effective when closed to apply a signal transition of said predetermined polarity to said first pulse generating means at the trailing edge of each second output pulse, and means responsive to a signal applied to said first pulse generating means of a polarity opposite said predetermined polarity for closing said switch.

2. The apparatus of claim 1, further comprising:

summing means connected to said first and second pulse generating means for producing an output signal in accordance with the sum of their output signals.

3. In combination, a first one-shot multivibrator having an input terminal and an output terminal and responsive to a signal transition applied to said input terminal to produce an output pulse of predetermined polarity and duration on said output terminal, a second one-shot multivibrator having an input terminal and an output terminal and responsive to a signal transition applied to said input terminal to produce an output pulse of a polarity opposite said predetermined polarity and of said predetermined duration on its output terminal, an electronic switch, means connecting said electronic switch between the output terminal of said second one-shot multivibrator and the input terminal of said first one-shot multivibrator, and means responsive to a signal applied to the input terminal of said first one-shot multivibrator for closing said switch.

4. The apparatus of claim 3, further comprising:

summing means connected to the output terminals of said multivibrators for producing an output signal in accordance with the sum of the signals produced on said output terminals.

5. A tone burst generator for applying a balanced signal to a transmission line, comprising:

summing means having a pair of input terminals and an output terminal, said output terminal being adapted to be connected to a transmission line, first unipolar pulse generating means comprising an input terminal adapted to receive an input signal of a predetermined polarity, an output terminal, and means responsive to the leading edge of a signal applied to said input terminal for producing an output pulse of predetermined polarity and duration, means connecting the output terminal of said first pulse generating means to one input terminal of said summing means, second unipolar pulse generating means comprising an input terminal, an output terminal, and means responsive to the trailing edge of a pulse of said predetermined polarity applied to said input terminal for producing an output pulse on the output terminal of said second pulse generating means of a polarity opposite said predetermined polarity and of said predetermined duration, means connecting the output terminal of said second pulse generating means to the other input terminal of said summing means, and switching means connected to the output terminal of said second pulse generating means and responsive to an input signal of said predetermined polarity on the input terminal of said first pulse generating means for applying the output signal of said second pulse generating means as an input signal to said first pulse generating means.

6. The apparatus of claim 5, in which:

said first pulse generating means is a monostable multivibrator, and in which said second pulse generating means is a complementary monostable multivibrator.

7. The apparatus of claim 5, in which:

said first pulse generating means comprises a monostable multivibrator, and in which said second pulse generating means comprises an inverter, a monostable multivibrator, and a second inverter connected in series in that order.

8. In a tone burst generator:

first and second unipolar pulse generators connected in series, said second pulse generator being triggered by the trailing edge of the output pulse of said first pulse generator, said pulse generators producing pulses of equal duration and opposite polarity when triggered, an OR gate connected to said first pulse generator and having a pair of input terminals, said gate being responsive to an applied input signal transition applied to either input terminal for triggering said first pulse generator, an electronic switch connected between said second pulse generator and one input terminal of said OR gate for applying the output signal of said second pulse generator to said OR gate when said switch is closed, and means responsive to a signal applied to the other input terminal of said OR gate for closing said switch.

9. The apparatus of claim 8, further comprising:

summing means connected to said pulse generator for producing an output signal in accordance with the sum of their output signals.

10. The apparatus of claim 9, in which said pulse generators are complementary one-shot multivibrators.

11. The apparatus of claim 9, in which one of the said pulse generators comprises:

a monostable multivibrator, and in which said second pulse generator comprises an inverter and a monostable multivibrator connected in series.

12. In combination:

first and second triggerable pulse generating means, said pulse generating means producing pulses of equal duration but opposite polarity when triggered, means responsive to the trailing edge of each pulse produced by said first pulse generating means for triggering said second pulse generating means, triggering means responsive to an applied signal for triggering said first pulse generating means, an input terminal adapted to receive input pulses of varying duration, means connected to said input terminal and responsive to the leading edge of a pulse applied to said input terminal for applying a signal to said triggering means, switching means connected between said second pulse generating means, said input terminal and said triggering means and responsive to a signal applied to said input terminal and to the trailing edge of a pulse produced by said second pulse generating means for applying a signal to said triggering means, and summing means controlled by said pulse generating means for producing an output signal in accordance with the sum of the pulses produced by said pulse generating means.